US012567830B1

(12) United States Patent
Wang

(10) Patent No.: US 12,567,830 B1
(45) Date of Patent: Mar. 3, 2026

(54) HIGH-EFFICIENCY AND SCALABLE ELECTRIC PHOTOVOLTAIC DEVICE

(71) Applicant: Ning Wang, Weihai (CN)

(72) Inventor: Ning Wang, Weihai (CN)

( * ) Notice: Subject to any disclaimer, the term of this patent is extended or adjusted under 35 U.S.C. 154(b) by 0 days.

(21) Appl. No.: 19/286,843

(22) Filed: Jul. 31, 2025

(51) Int. Cl.
*H02S 30/10* (2014.01)

(52) U.S. Cl.
CPC .................................... *H02S 30/10* (2014.12)

(58) Field of Classification Search
CPC ........................................................ H02S 30/10
See application file for complete search history.

(56) References Cited

U.S. PATENT DOCUMENTS

| | | | | |
|---|---|---|---|---|
| 2004/0124711 | A1* | 7/2004 | Muchow | F24S 25/10 |
| | | | | 307/64 |
| 2011/0176256 | A1* | 7/2011 | Van Straten | F03D 13/20 |
| | | | | 290/55 |
| 2017/0141721 | A1* | 5/2017 | Schmidt | F21V 21/22 |
| 2017/0288605 | A1* | 10/2017 | Chen | F24S 30/458 |
| 2018/0019703 | A1* | 1/2018 | Almy | H02S 30/10 |
| 2018/0351502 | A1* | 12/2018 | Almy | H10F 77/955 |
| 2019/0006984 | A1* | 1/2019 | Albertella | H02S 20/30 |
| 2020/0204107 | A1* | 6/2020 | Li | H10F 19/31 |

* cited by examiner

*Primary Examiner* — Golam Mowla
(74) *Attorney, Agent, or Firm* — JEEN IP LAW, LLC

(57) ABSTRACT

A scalable electric photovoltaic panel power-generation system is provided. The system includes components such as a stacked installation structure for photovoltaic panels, a scalable electric mechanism, a remote-control module, a clutch structure, an ACC linkage module, and a ball free slide rail. Single control or group control can be achieved through wireless remote control to control the expansion and contraction of the photovoltaic panels; the clutch structure supports electric/manual dual-mode adjustment, automatic locking after electric retraction, and emergency operation when manually pushed back; linkage with ACC signal to ensure automatic return of a carrier upon startup; the ball free slide rail design is suitable for harsh environments, and a motion mechanism is separated from the photovoltaic panel to avoid damage caused by pulling. This system is easy to install and has strong wind resistance, suitable for various scenarios such as RVs and outdoor operations.

8 Claims, 18 Drawing Sheets

1

6

HIGH-EFFICIENCY AND SCALABLE ELECTRIC PHOTOVOLTAIC DEVICE

TECHNICAL FIELD

The present disclosure relates to the field of energy technologies, and in particular, to a high-efficiency and scalable electric photovoltaic device.

BACKGROUND

In the field of new energy, photovoltaic technology, as a key means of clean energy utilization, is constantly expanding its application scenarios. However, traditional photovoltaic devices have many limitations in practical applications.

Most photovoltaic panels are installed in a fixed manner, which makes it difficult to flexibly adjust the deployment area according to usage needs, resulting in low space utilization, especially in mobile scenarios such as RVs and outdoor work vehicles, it is difficult to balance limited space and power generation needs.

Some scalable photovoltaic systems rely on manual operation, which is cumbersome and inefficient to adjust, and cannot achieve remote control or batch management, and it is difficult to meet the needs of intelligent use.

The existing electric telescopic system is easily affected by harsh environments, such as rain, snow, wind and sand, which can cause rusting and jamming of the sliding rail, and insufficient wind resistance, resulting in poor stability when used outdoors.

The motion mechanism of some systems is directly related to the photovoltaic panels, which can easily generate pulling force on the panels during a motion process, resulting in a high damage rate. At the same time, the installation is complex, and the maintenance cost is high.

Lack of effective safety linkage mechanism, such as lack of coordination with the power supply system (ACC) of vehicles and other carriers, and inability to automatically return to its original position in specific scenarios (such as when the vehicle is started), thereby posing safety hazards.

Therefore, developing an electric expansion photovoltaic panel power generation system having such as remote control, resistance to harsh environments, structural separation, and safety linkage has become an important direction for improving the practicality and reliability of photovoltaic devices.

SUMMARY

The purpose of the present disclosure is to provide a high-efficiency and scalable electric photovoltaic device, aiming to solve problems existing in the background technology. To achieve the stated objectives, the technical solution adopted by the present disclosure is as follows.

A high-efficiency and scalable electric photovoltaic device, including a housing component, a driving component, telescopic components, and a controller; the driving component is provided at a head portion of the housing component, and the telescopic components are provided on two sides of the housing component; the controller is provided on the driving component, and the driving component is configured to drive the telescopic components to perform reciprocating motion.

In some embodiments of the present disclosure, the housing component includes a first sealing plate, a second sealing plate, a protective cover, an installation housing, side installation plates, a C-shaped plate, and a L-shaped plate, an interior of the protective cover is provided with an installation housing, and the driving component is provided inside the installation housing; left and right sides of the protective cover are both provided with the side installation plates, and tops of the side installation plates are configured to install photovoltaic modules; front and rear sides of the side installation plates are respectively provided with the first sealing plate and the second sealing plate; the C-shaped plate is provided inside the side installation plates, and the telescopic component is provided on inner sides of the side installation plates through the C-shaped plate; the L-shaped plate is provided on an inner side of the telescopic components, and the L-shaped plate is configured to install the photovoltaic modules.

In some embodiments of the present disclosure, a plurality of fixing blocks are provided on the side installation plates and the L-shaped plate, and the fixing blocks are configured to fix and install the photovoltaic modules.

In some embodiments of the present disclosure, a plurality of installation plates are provided on outer sides of the side installation plates.

In some embodiments of the present disclosure, the driving component includes a motor, a motor mounting member, a motor fixing member, a first coupling, a second coupling, a limit rod, a gear member, a connection rod, a first gear installation rod, a second gear installation rod, a first gear, a second gear, a driven gear member, a third gear installation rod, a fourth gear installation rod, and a gear fixing plate, the motor fixing member is provided on a left side of the motor mounting member, a motor shaft of the motor is connected to a shaft of the gear member through the first coupling, the motor is provided between the motor fixing member and the motor mounting member, the gear component is provided in the motor mounting member, the limit rod is provided on a rear side of the gear component, a front side of the gear component is provided with the driven gear component that meshes with gears in the gear component; a left side of the driven gear component is connected to the first gear installation rod, the first gear is provided on the first gear installation rod; a left side of the gear component is provided with the second gear installation rod, the second gear is provided on the second gear installation rod; the first gear meshes with the second gear, a rear side of the motor is provided with the connection rod that penetrates the motor fixing component; the gear fixing plate is provided with the third gear installation rod and the fourth gear installation rod; the third gear installation rod and the fourth gear installation rod are respectively connected to the third gear and the fourth gear, the third gear rod penetrates the gear fixing plate and is connected to the connection rod through the second coupling.

In some embodiments of the present disclosure, the driven gear member is further provided with a toggle member, and the toggle member is configured to control the driven gear member to move forward or backward so as to mesh with or not mesh with the gear member.

In some embodiments of the present disclosure, the telescopic components include a gear rack, first POM rods, a second POM rod, a first M-shaped profile, a second M-shaped profile, and a limit block, the gear rack is provided inside the side installation plates, the first M-shaped profile is provided inside the C-shaped plate, the first POM rods are provided at a top and a bottom of the first M-shaped profile, the first M-shaped profile is slid on the C-shaped plate through the first POM rods, the limit block is provided on a rear side of the first M-shaped profile, and the second M-shaped profile is provided inside the first M-shaped profile; a top and a bottom of the second M-shaped profile are provided with a second PB board, the second M-shaped profile is slid on the first M-shaped profile through the second POM rod, the limit block is configured to prevent the second POM rod from sliding out.

In some embodiments of the present disclosure, the controller is a circuit board.

In some embodiments of the present disclosure, the circuit board is provided with a main control circuit, a power interface circuit, an LDO voltage stabilizing circuit, a remote-control receiving circuit, a code signal detection circuit, a motor output driving circuit, a wind sensing circuit, a buzzer circuit, a Hall signal acquisition circuit, and a motor output circuit, where the motor output driving circuit is electrically connected to the motor output circuit, the main control circuit is electrically connected to the power interface circuit, the LDO voltage stabilizing circuit, the remote-control receiving circuit, the code signal detection circuit, the motor output driving circuit, the wind sensing circuit, the buzzer circuit, and the Hall signal acquisition circuit.

The beneficial effects of the present disclosure are as follows.

High efficiency power generation: this device uses a scalable structure to allow the photovoltaic modules to receive more sunlight, thereby improving power generation efficiency. At the same time, the plurality of fixing blocks provided on the side installation plates and L-shaped plate can stably install the photovoltaic modules, ensuring their stability during operation and further guaranteeing power generation efficiency.

Strong scalability: with a collaborative effect of the driving component and the telescopic component, the photovoltaic device has achieved automatic scalability. The motor in the driving component drives the gear rack, M-shaped profile and other components in the telescopic component accurately through a series of gear transmission structures, thereby improving space utilization.

High degree of automation: the device is provided with the controller (circuit board), which is provided with remote control receiving circuit, motor output driving circuit, etc., enabling remote control operation and automation control. At the same time, providing the wind sensing circuit and other components enables the device to automatically adjust its state according to an external environment (such as wind speed), thereby enhancing the intelligence level and safety of the device.

Stable and reliable structure: the protective cover, installation housing, and other components in the housing component provide good protection for the internal driving component and the telescopic component, thereby reducing an impact of the external environment on the internal components. Providing the first POM rods and the second POM rod in the telescopic component ensures the smoothness of the M-shaped profile during sliding, and the limit block can effectively prevent the components from sliding out, thereby improving the stability and service life of the overall structure.

Flexible driving mode: with the help of the toggle member on the driven gear, a quick switching between electric driving and manual adjustment can be achieved. The electric mode meets the requirements of automation control and is suitable for efficient daily operation; manual mode provides convenient operation in case of electric system failure or special scenarios (such as precision fine-tuning), thereby improving the reliability and adaptability of the device.

Easy installation: the side installation plates, L-shaped plate, and fixing blocks provide a convenient fixing structure for the installation of the photovoltaic modules, reducing installation difficulty and improving installation efficiency.

Complete safety protection: provided with controllable thrust anti-collision function, automatically stops when encountering obstacles, avoiding damage to the mechanism or photovoltaic panel; linked with ACC signal, ACC priority is higher than the remote control. When the vehicle is started (ACC is turned on), the photovoltaic panels can be automatically retracted, and the remote-control operation is invalid at this time, ensuring the safe operation of a carrier. A crosswind resistance can reach 17 m/s (level 8 wind), and the stability is strong when extended, rendering it suitable for complex outdoor environments.

Resistant to harsh environments and highly durable: using a ball free sliding rail design, thereby effectively avoiding rusting and jamming caused by rain, snow, wind and sand.

Structural separation to protect the photovoltaic panels: a moving mechanism is separated from the photovoltaic panels, and the mechanism will not exert external force on the photovoltaic panels during movement, reducing the damage rate; simplifying the installation process and facilitating maintenance.

Numeral reference: 1—housing component; 11—first sealing plate; 12—second sealing plate; 13—protective cover; 14—installation housing; 15—side installation plate; 16—C-shaped plate; 17—L-shaped plate; 2—driving component; 201—motor; 202—motor mounting member; 203—motor fixing member; 204—first coupling; 205—second coupling; 206—limit rod; 207—gear member; 208—connection rod; 209—first gear installation rod; 210—second gear installation rod; 211—first gear; 212—second gear; 213—driven gear member; 214—third gear installation rod; 215—fourth gear installation rod; 216—gear fixing plate; 217—third gear; 218—fourth gear; 3—telescopic component; 31—gear rack; 32—first POM rod; 33—second POM rod; 34—first M-shaped profile; 35—second M-shaped profile; 36—limit block; 4—controller; 5—fixing block; 6—installation plate; 7—toggle member.

DESCRIPTION OF EMBODIMENTS

In order to facilitate the understanding of the present disclosure, a more comprehensive description of the present disclosure will be provided below with reference to the relevant drawings. The preferred embodiment of the present disclosure is shown in the accompanying drawings. However, the present disclosure can be implemented in many different forms and is not limited to the embodiments described herein. On the contrary, the purpose of providing these embodiments is to provide a more thorough and comprehensive understanding of the present disclosure.

It should be noted that when a component is referred to as "fixed to" another component, it can be directly on the other component or there can also be a centered component. When a component is referred to be "connected" to another component, it can be directly connected to another component or there may be a central component present at the same time. On the contrary, when a component is referred to as "directly on" another component, there is no intermediate component. Terms "vertical", "horizontal", "left", "right" and similar expressions used in this specification are for illustrative purposes only and do not represent the only implementation mode. Terms "upper end", "lower end", "left side", "right side", "front end", "rear end" and similar expressions used in this specification are based on the positional relationship of the reference figures.

Unless otherwise defined, all technical and scientific terms used in this specification have the same meanings as those commonly understood by those skilled in the art belonging to the present disclosure. Terms used in this specification of the present disclosure are only for the purpose of describing specific embodiments and are not intended to limit the present disclosure. The term "and/or" used in this specification includes any and all combinations of one or more related listed items.

Below, a further detailed explanation of the technical solution of this application will be provided in combination with specific implementation modes.

Figure 1:
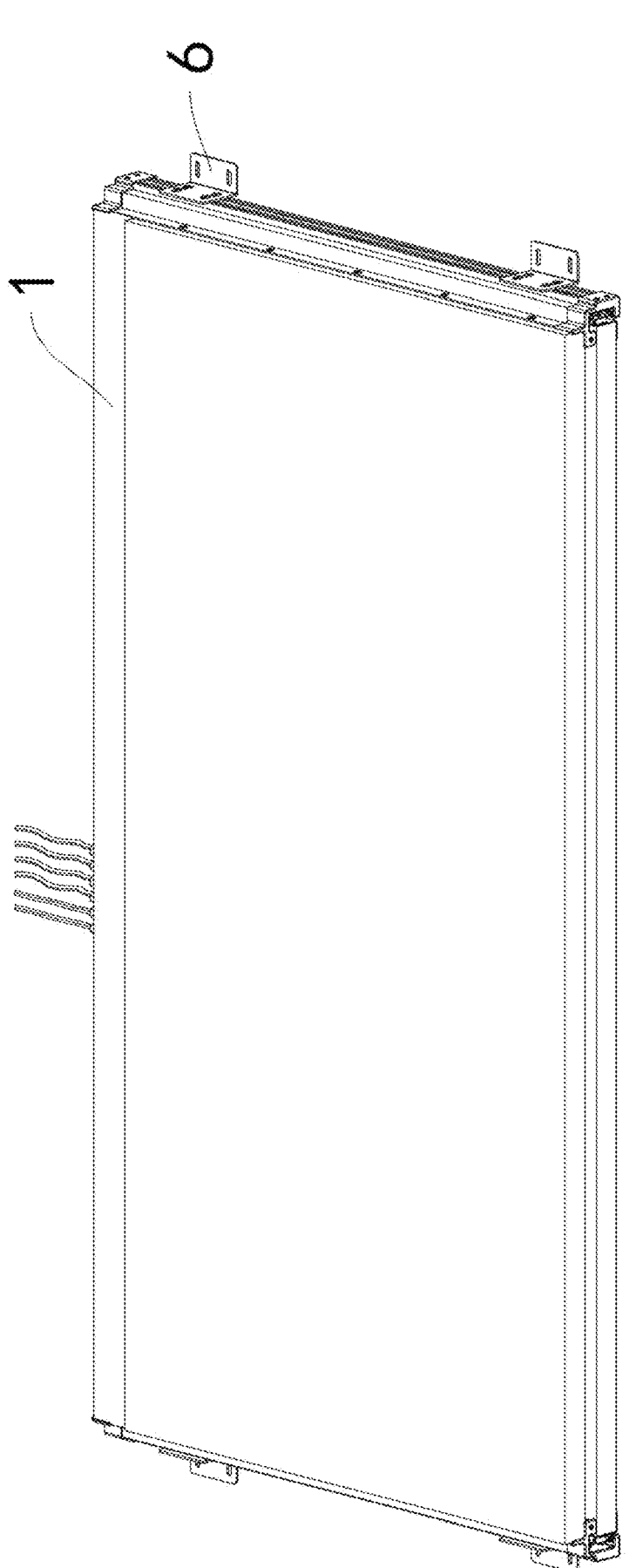
FIG. 1 is an overall schematic diagram provided by an embodiment of the present disclosure.
Figure 2:
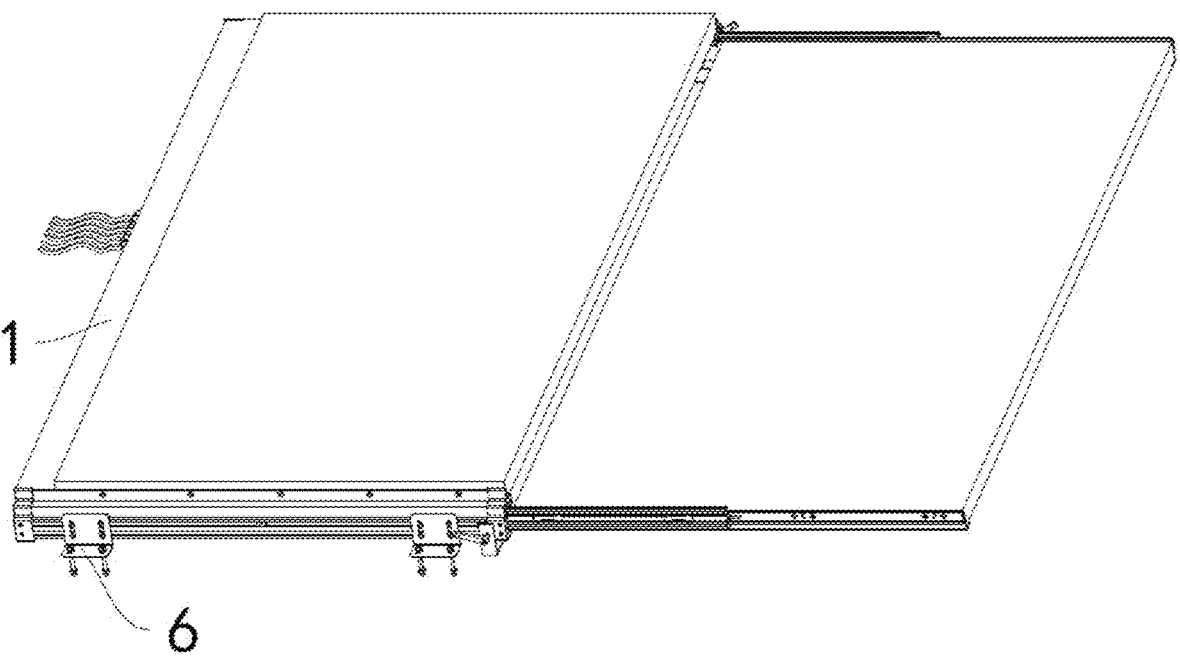
FIG. 2 is an overall deployment schematic diagram of an embodiment of the present disclosure.
Figure 3:
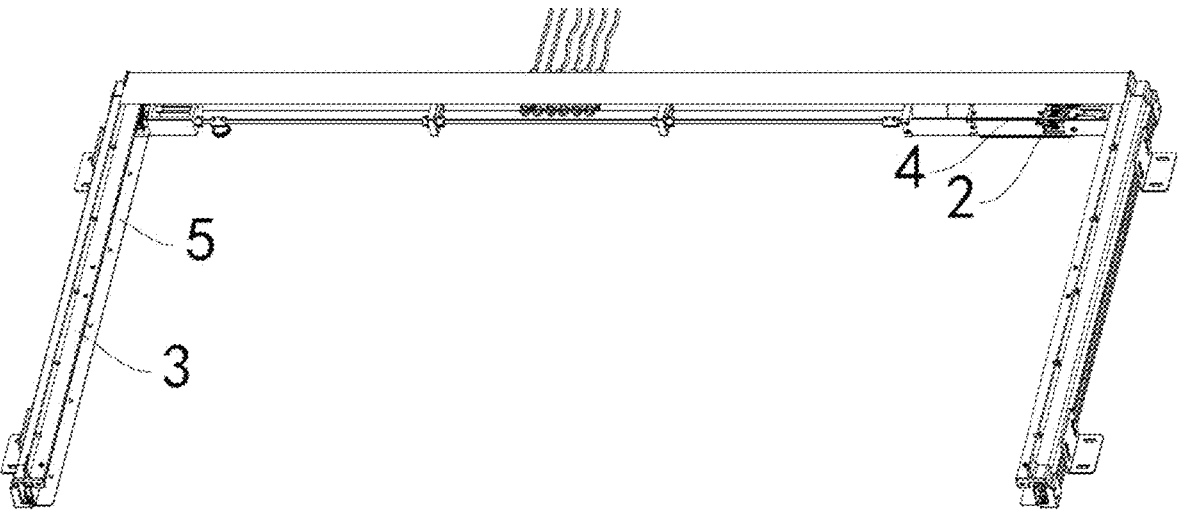
FIG. 3 is a first partial schematic structural diagram of an embodiment of the present disclosure.
Figure 4:
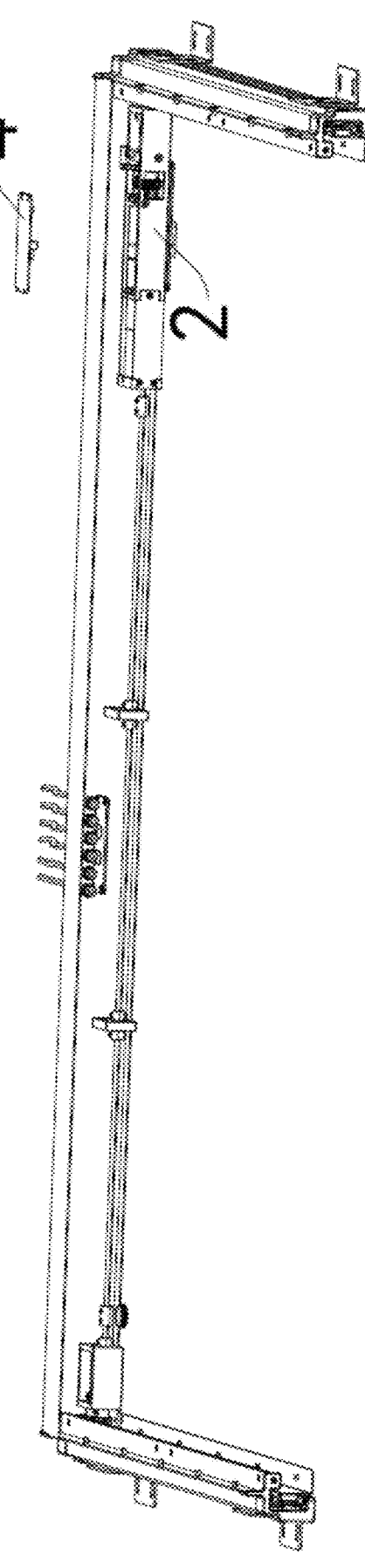
FIG. 4 is a second partial schematic structural diagram provided by an embodiment of the present disclosure.
Figure 5:
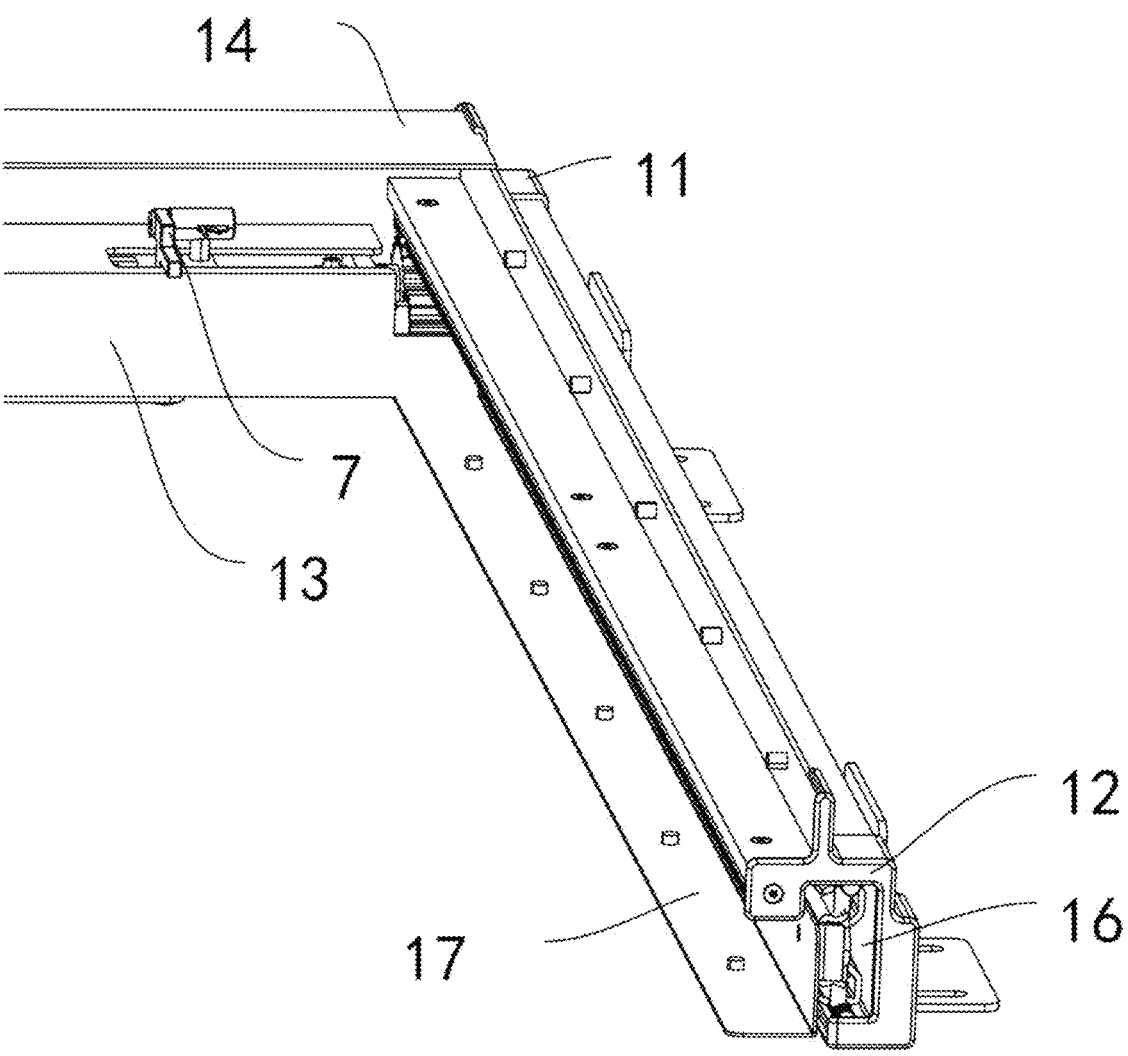
FIG. 5 is a partially enlarged structural schematic diagram of a housing component of an embodiment of the present disclosure.
Figure 6:
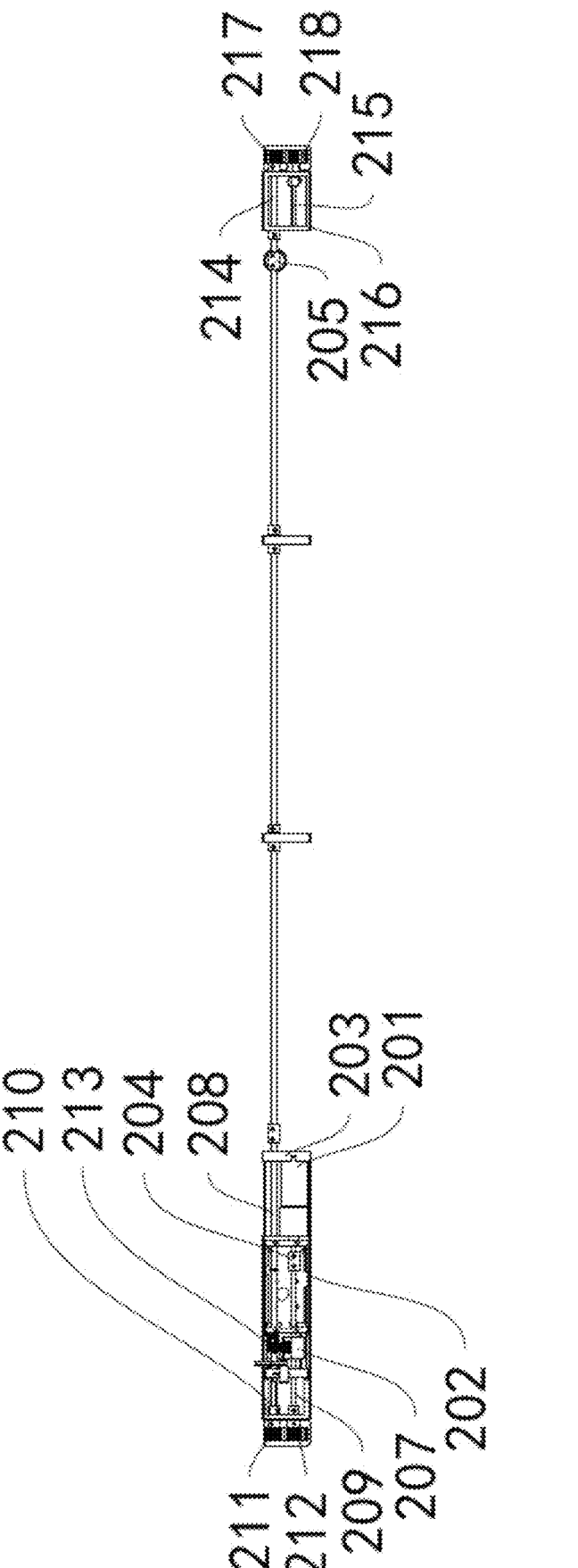
FIG. 6 is a schematic structural diagram of a driving component according to an embodiment of the present disclosure.
Figure 7:
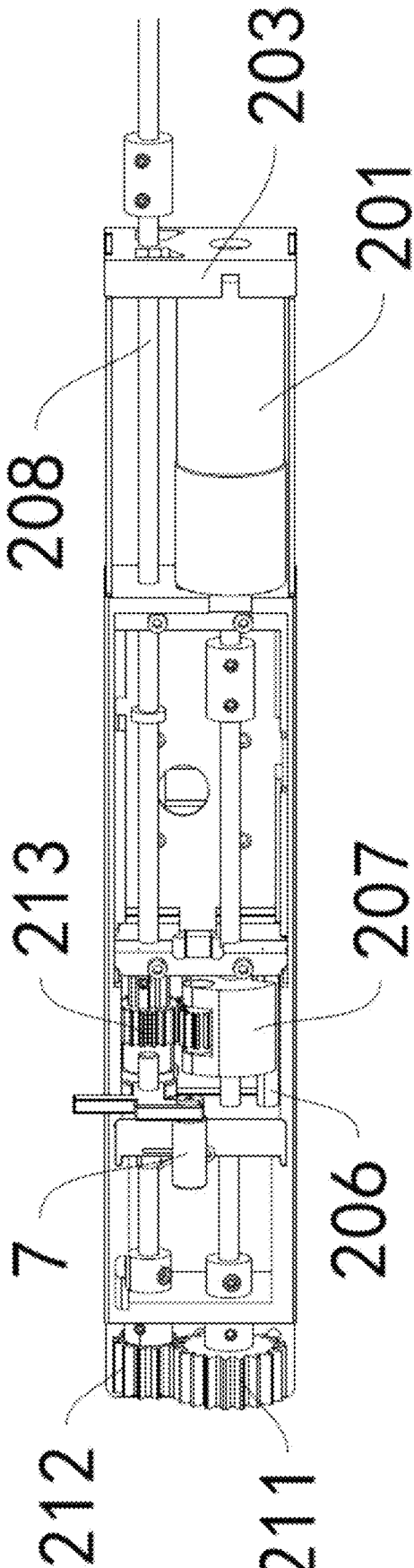
FIG. 7 is a partially enlarged structural schematic diagram of the driving component of an embodiment of the present disclosure.
Figure 8:
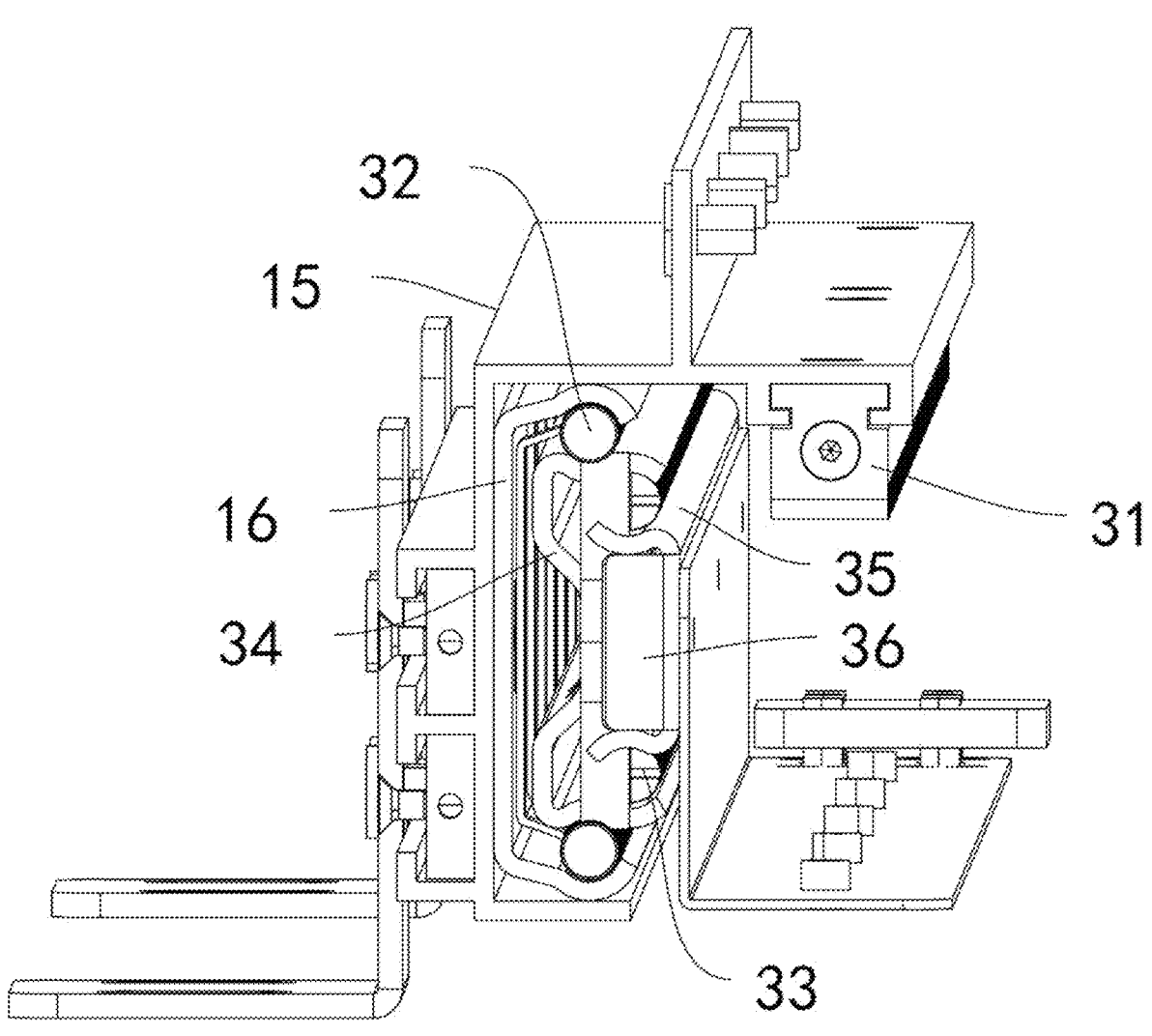
FIG. 8 is a schematic structural diagram of a telescopic component according to an embodiment of the present disclosure.
Figure 9:
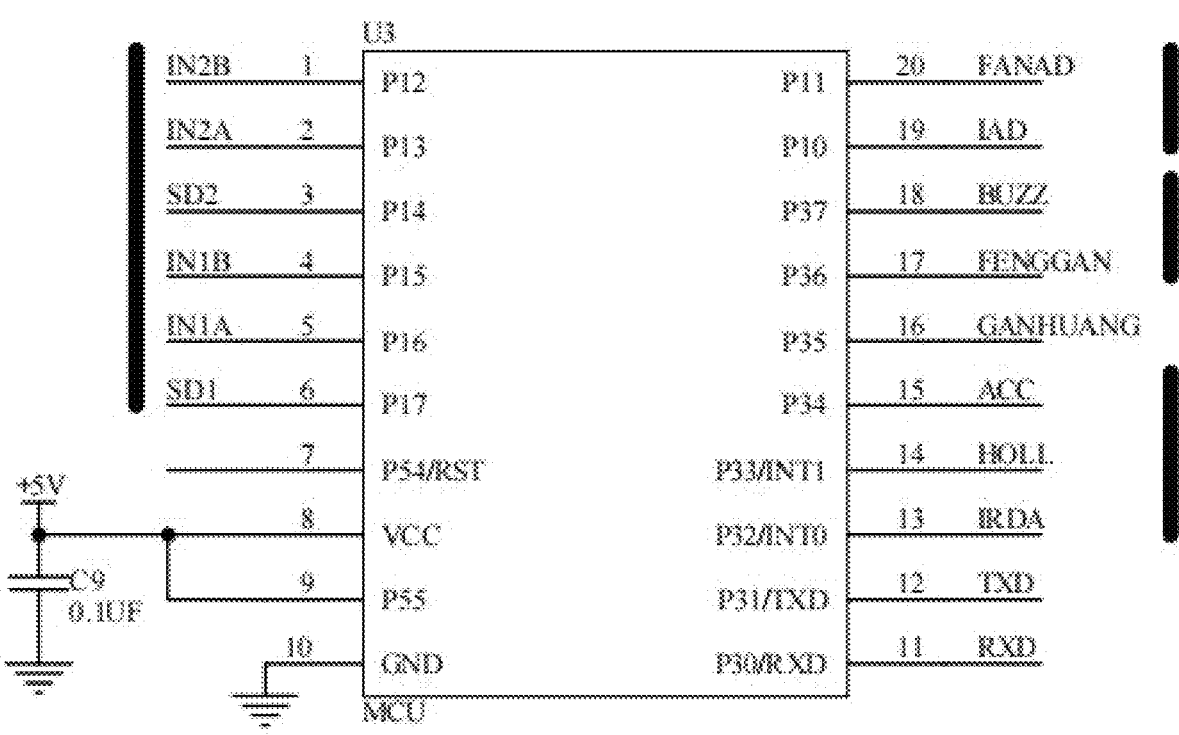
FIG. 9 is a schematic diagram of a main control circuit of an embodiment of the present disclosure.
Figure 9:
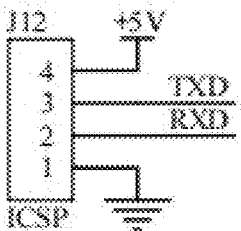
Figure 10:
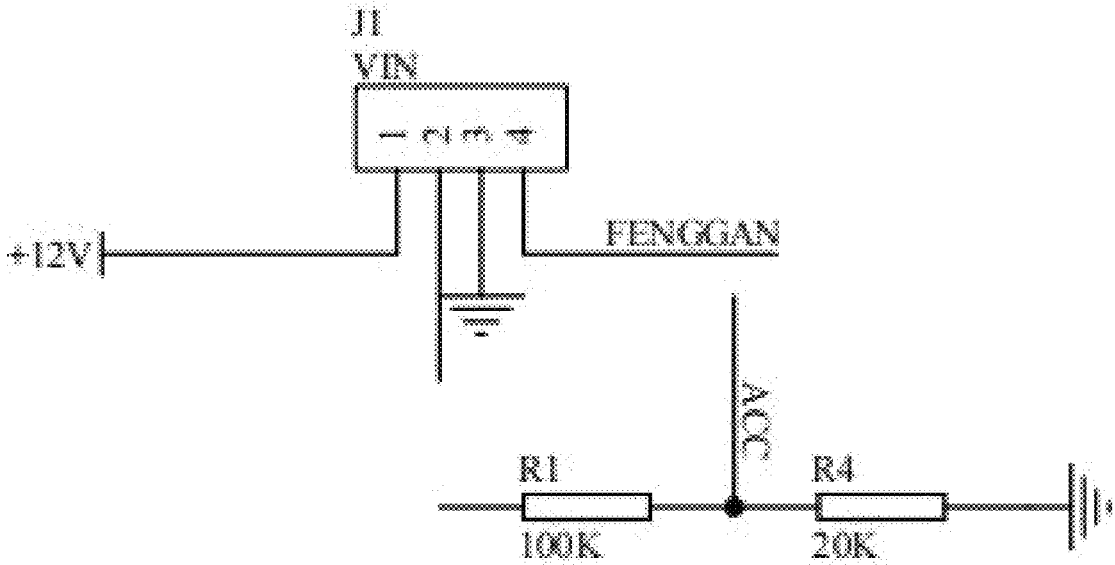
FIG. 10 is a schematic diagram of a power interface circuit according to an embodiment of the present disclosure.
Figure 11:
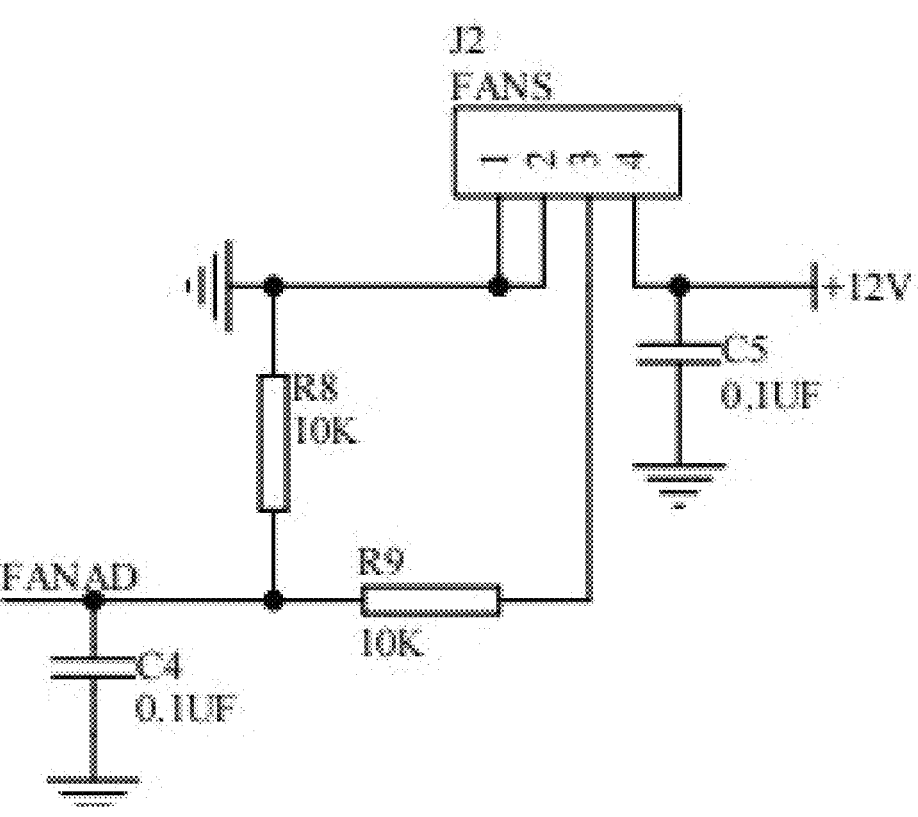
FIG. 11 is a schematic diagram of a wind sensing circuit according to an embodiment of the present disclosure.
Figure 12:
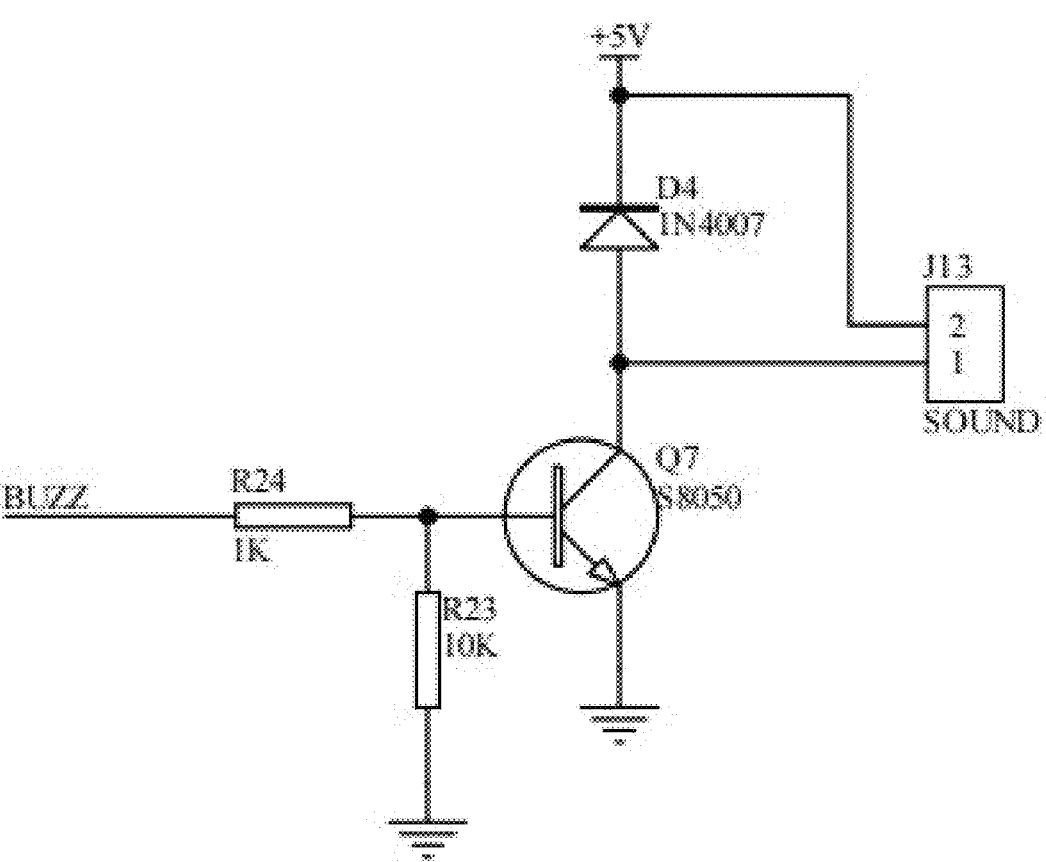
FIG. 12 is a schematic diagram of a buzzer circuit according to an embodiment of the present disclosure.
Figure 13:
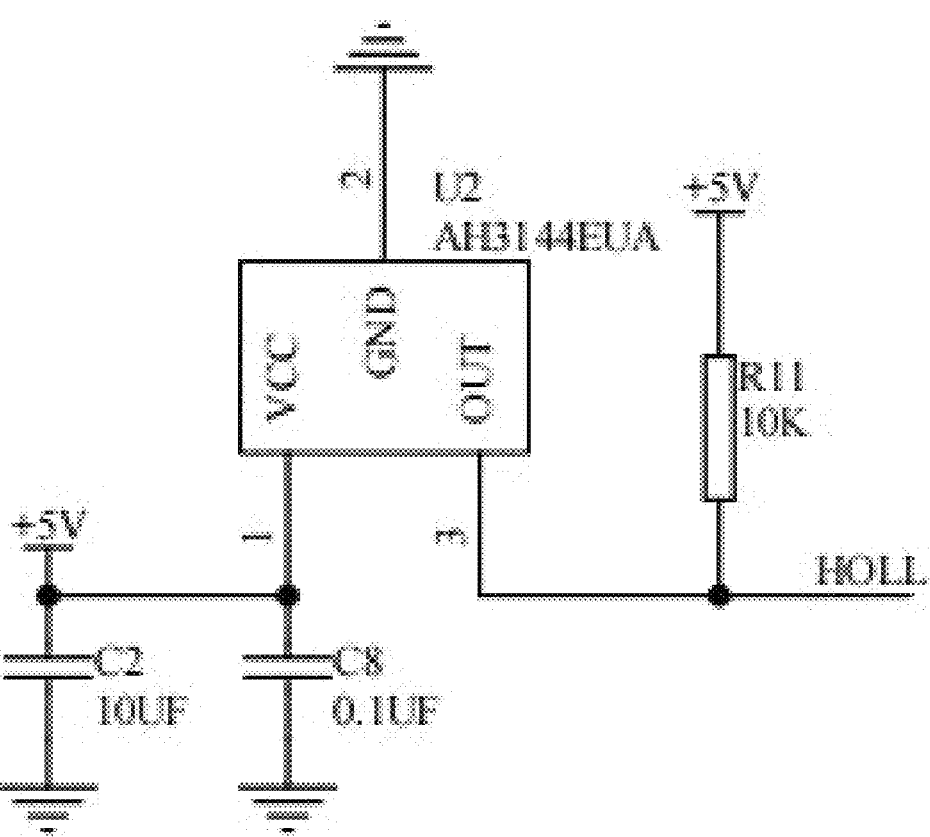
FIG. 13 is a schematic diagram of a Hall signal acquisition circuit according to an embodiment of the present disclosure.
Figure 14:
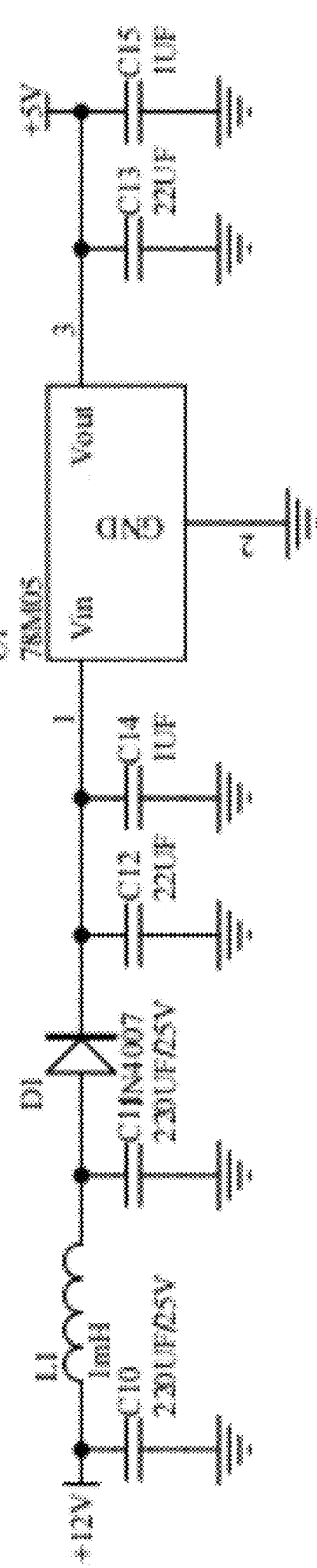
FIG. 14 is a schematic diagram of an LDO voltage stabilizing circuit according to an embodiment of the present disclosure.
Figure 15:
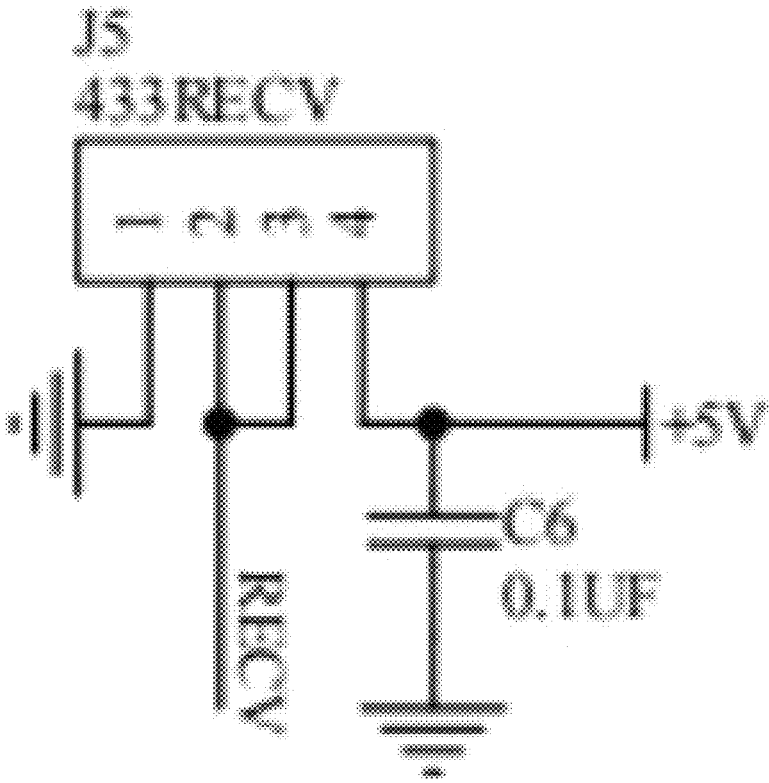
FIG. 15 is a schematic diagram of a remote-control receiving circuit according to an embodiment of the present disclosure.
Figure 16:
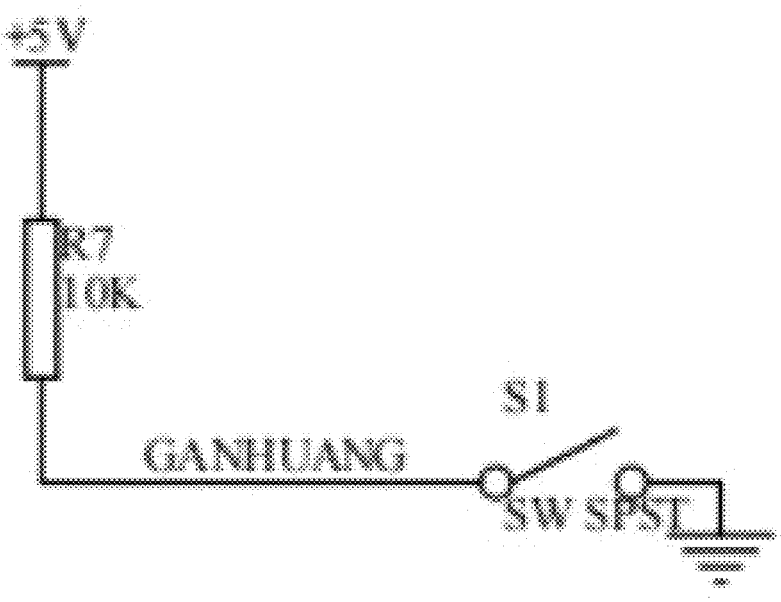
FIG. 16 is a schematic diagram of a code signal detection circuit according to an embodiment of the present disclosure.
Figure 17:
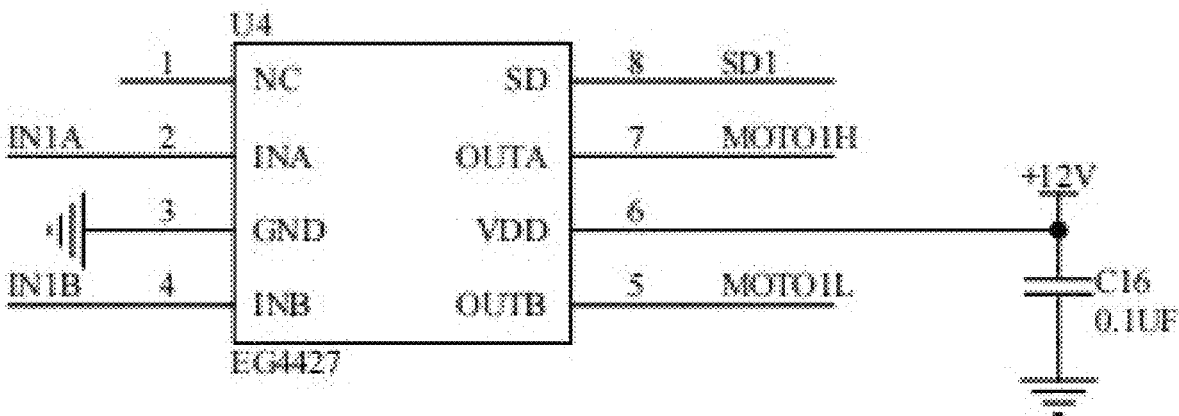
FIG. 17 is a schematic diagram of a motor output driving circuit according to an embodiment of the present disclosure.
Figure 17:
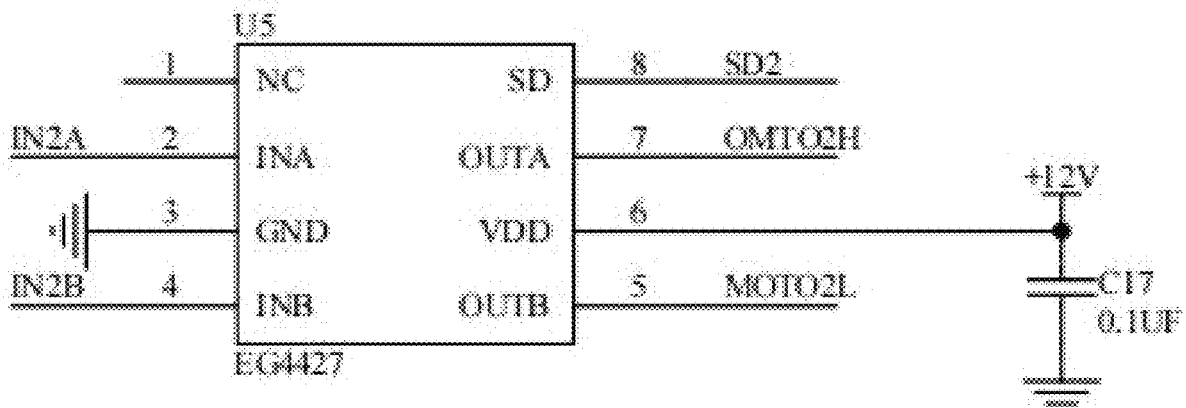
Figure 18:
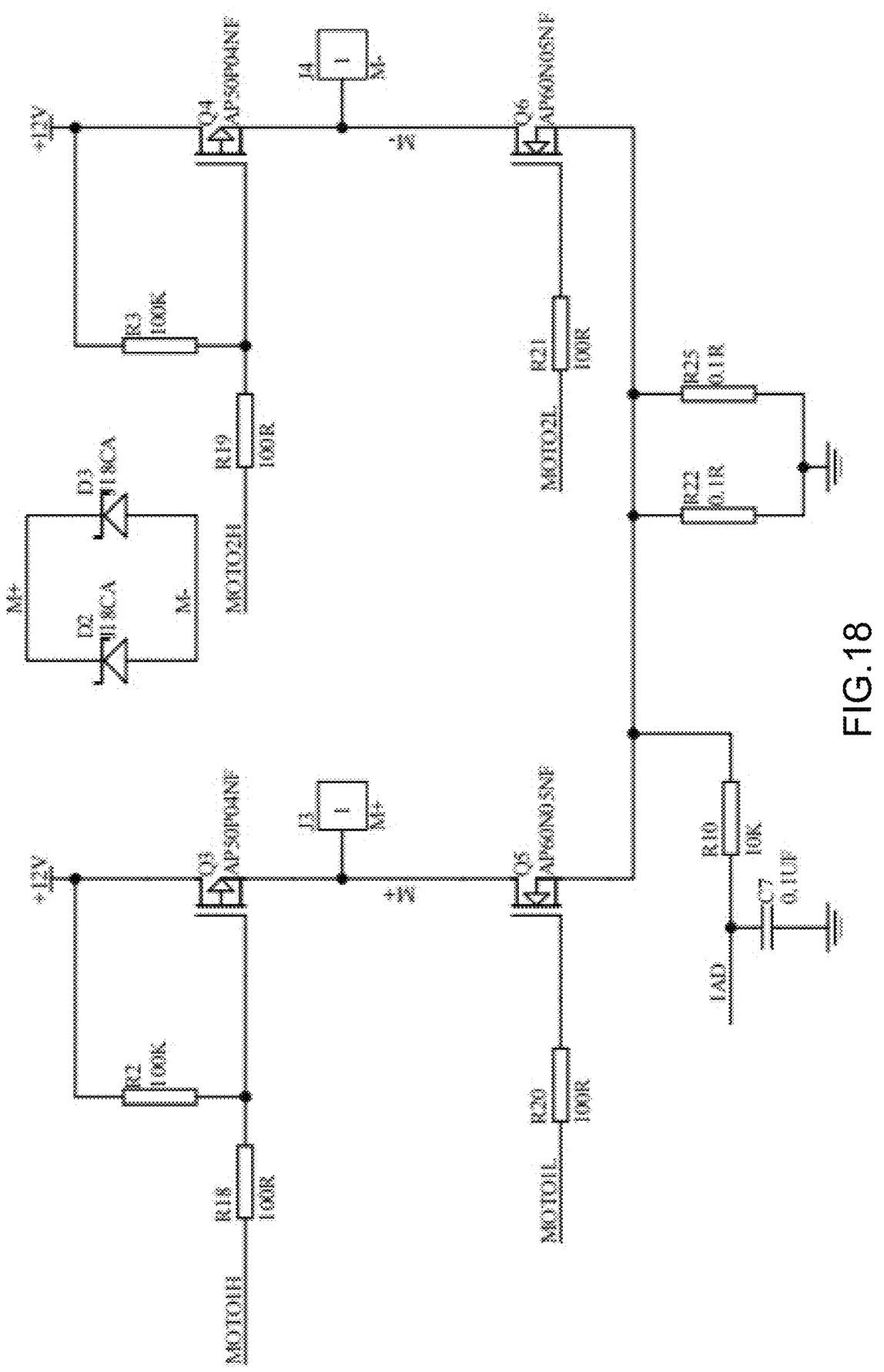
FIG. 18 is a schematic diagram of a motor output circuit according to an embodiment of the present disclosure.

As shown in FIGS. 1 to 18, an embodiment of the present disclosure provides an efficient and scalable electric photovoltaic device, including a housing component 1, a driving component 2, telescopic components 3, and a controller 4. The driving component 2 is provided at a head portion of the housing component 1, and the telescopic components 3 are provided on both left and right sides of the housing component 1. The controller 4 is provided on the driving component 2, and the driving component 2 is configured to drive the telescopic components 3 to perform reciprocating motions.

In this embodiment, the housing component 1 includes a first sealing plate 11, a second sealing plate 12, a protective cover 13, an installation housing 14, side installation plates 15, a C-shaped plate 16, and an L-shaped plate 17. The installation housing 14 is provided in the protective cover 13, and the driving component 2 is provided inside the installation housing 14. Left and right sides of the protective cover 13 are both provided with side installation plates 15. Tops of the side installation plates 15 are configured to install photovoltaic modules. Front and rear sides of the side installation plates 15 are respectively provided with the first sealing plate 11 and the second sealing plate 12. The C-shaped plate 16 is provided inside the side installation plates 15, and the telescopic components 3 are provided on inner sides of the side installation plates 15 through the C-shaped plate 16. The L-shaped plate 17 is provided inside of the telescopic components 3, and the L-shaped plate 17 is configured to install the photovoltaic modules.

In this embodiment, a plurality of fixing blocks 5 are provided on the side installation plates 15 and the L-shaped plate 17, and the fixing blocks 5 are configured to fix and install the photovoltaic modules.

In this embodiment, a plurality of installation plates 6 are provided on outer sides of the side installation plates 15.

In this embodiment, the driving component 2 includes a motor 201, a motor mounting member 202, a motor fixing member 203, a first coupling 204, a second coupling 205, a limit rod 206, a gear member 207, a connection rod 208, a first gear installation rod 209, a second gear installation rod 210, a first gear 211, a second gear 212, a driven gear member 213, a third gear installation rod 214, a fourth gear installation rod 215, and a gear fixing plate 216. The motor fixing member 203 is provided on a left side of the motor mounting member 202, and a shaft of the motor 201 is connected to a shaft of the gear member 207 through the first coupling 204. The motor 201 is provided between the motor fixing member 203 and the motor mounting member 202, and the gear member 207 is provided inside the motor mounting member 202. A rear side of the gear member 207 is provided with a limit rod 206, and a front side of the gear member 207 is provided with a driven gear member 213 that meshes with gears in the gear member 207. A left side of the driven gear member 213 is connected to the first gear installation rod 209, and the first gear installation rod 209 is provided with the first gear 211. A left side of the gear member 207 is provided with the second gear installation rod 210, and the second gear installation rod 210 is provided with the second gear 212. The first gear 211 and the second gear 212 mesh with each other. A rear side of the motor 201 is provided with the connection rod 208, and the connection rod 208 passes through the motor fixing member 203. The gear fixing plate 216 is provided with the third gear installation rod 214 and the fourth gear installation rod 215. A third gear 217 and a fourth gear 218 are respectively connected to the third gear installation rod 214 and the fourth gear installation rod 215. The third gear rod passes through the gear fixing plate 216 and the connection rod 208 through the second couplings 205.

In this embodiment, the driven gear member 213 is further provided with a toggle member 7, and the toggle member 7 is configured to control forward or backward movement of the driven gear component to mesh or not mesh with the gear member 207.

In this embodiment, the telescopic components 3 includes a gear rack 31, first POM rods 32, a second POM rod 33, a first M-shaped profile 34, a second M-shaped profile 35, and a limit block 36. The gear rack 31 is provided inside the side installation plates 15, the first M-shaped profile 34 is provided inside the C-shaped plate 16, and the first POM rods 32 are provided on a top and a bottom of the first M-shaped profile 34. The first M-shaped profile 34 is slid on the C-shaped plate 16 through the first POM rods 32, and the limit block 36 is provided at a rear side of the first M-shape profile. The second M-shaped profile is provided inside the first M-shaped profile 34, and a second PB plate is provided on a top and a bottom of the second M-shaped profile 35. The second M-shaped profile 35 is slid on the first M-shaped profile through the second POM rod 33, and the limit block 36 is configured to prevent the second POM rod 33 from sliding out.

In this embodiment, the controller 4 is a circuit board.

In this embodiment, the circuit board is provided with a main control circuit, a power interface circuit, an LDO voltage stabilizing circuit, a remote-control receiving circuit, a code signal detection circuit, a motor output driving circuit, a wind sensing circuit, a buzzer circuit, a Hall signal acquisition circuit, and a motor output circuit. The motor output driving circuit is electrically connected to the motor output circuit, the main control circuit is electrically connected to the power interface circuit, the LDO voltage stabilizing circuit, the remote-control receiving circuit, the code signal detection circuit, the motor output driving circuit, the wind sensing circuit, the buzzer circuit, and the Hall signal acquisition circuit.

Working principle: the driven gear member 213 in the driving component 2 is provided with the toggle member 7, which can be manually controlled to change a position of the driven gear member 213. When the toggle member 7 controls an engagement between the driven gear member 213 and the gear member 207, the device enters an electric drive mode. When the toggle member 7 controls the driven gear member 213 to be disengaged from the gear member 207, the device is switched to a manual adjustment mode.
Electric Drive Mode Control instruction reception and transmission: the controller 4 (circuit board) receives an external remote-control signal through the remote control receiving circuit, or senses changes in the external environment through its own integrated sensors (such as sensors connected to the wind sensing circuit), and then the main control circuit processes the signals and sends a control instruction to the motor output driving circuit.

Power output of the driving component 2: after receiving the instruction, the motor output driving circuit controls the motor 201 to start. The power of the motor 201 is transmitted to the gear member 207 through the first coupling 204, and the gear member 207 is rotated and drives the driven gear member 213 that meshes with it to move. The driven gear member 213 drives the first gear 211 to rotate through the first gear installation rod 209, and the gear member 207 drives the second gear 212 to rotate through the second gear installation rod 210. The first gear 211 and the second gear 212 mesh with each other, further transmitting power. Besides that, the connection rod 208 behind the motor 201 drives the third gear 217 on the third gear installation rod 214 to rotate through the second coupling 205. The third gear 217 cooperates with the fourth gear 218 (provided on the fourth gear installation rod 215) to achieve multi-directional power transmission.

Movement implementation of the telescopic components 3: the power transmitted by the driving component 2 drives the gear rack 31 in the telescopic components 3 to move. The movement of the gear rack 31 causes the first M-shaped profile 34 to slide inside the C-shaped plate 16 through the first POM rods 32, and the second M-shaped profile 35 inside the first M-shaped profile 34 is slid inside the first M-shaped profile 34 through the second POM rod 33, thereby achieving telescopic action. The limit block 36 prevents the second POM rod 33 from slipping out during movement, thereby ensuring stability during the expansion and contraction process.

Position adjustment of the photovoltaic modules: with the expansion and contraction movement of the telescopic components 3, the photovoltaic modules provided on the side installation plates 15 and the L-shaped plate 17 are expanded or contracted accordingly, thereby adjusting the position and expansion area of the photovoltaic modules to adapt to lighting conditions and improve power generation efficiency. When it is necessary to stop or adjust the motion state, the controller 4 controls the motor 201 to stop or change the direction of rotation through relevant circuits, thereby achieving precise control of the device.

Manual adjustment mode: when the driven gear member 213 is disengaged from the toggle member 7, the power of the motor 201 cannot be transmitted to a subsequent gear structure. At this time, the first gear 211 and the second gear 212, or the third gear 217 and the fourth gear 218 in the driving component 2 can be manually moved to drive the gear rack 31 and the telescopic components to move, thereby achieving manual telescopic adjustment of the photovoltaic component and meeting the operational requirements in special scenarios.

ACC linkage control: the system is connected to the carrier ACC signal. When the photovoltaic panel is not in the retracted state, ACC is turned on (such as vehicle ignition), and the system automatically executes the retraction action.

The priority of ACC signal is higher than that of the remote control. When ACC is turned on, the remote-control operation is invalid, ensuring that the photovoltaic panel is in a safe state when the carrier is running.

Environmental adaptation and protection: the design of ball free slide rail reduces friction points and avoids jamming caused by rain, snow, wind and sand; IP55 protection level isolates dust and low-pressure water intrusion. The wind resistant structural design enables it to withstand a crosswind of 17 m/s in an extended state, ensuring stability for outdoor use.

Energy and signal synergy: the power supply is compatible with DC11-15V (current>5 A), and the wind sensing signal (optional) can be automatically adjusted according to the wind speed after being connected. The photovoltaic panel leads are fixed in a cycloidal manner to avoid pushing and pulling during a mechanism movement, ensuring stable operation of the power generation system.
Remote Control Process
Single Control Operation Preparation work: checking if all components of the device are securely installed, ensuring that the power connection is normal, the voltage is within a range of DC11-15V, and the current is greater than 5 A.

Starting the device: pressing a corresponding button (1-6) on the remote control to start the corresponding electric telescopic photovoltaic panel power generation system, and the device is started to extend.

Retraction operation: when it is necessary to retract the photovoltaic panels, the corresponding number button is pressed, and the device will begin to retract until it is fully retracted and automatically locked. At this point, it cannot be pulled out.

Group Control Operation

Preparation work is the same as single control operation.

General opening operation: pressing a general opening button on the remote control, and all connected systems will respond to the extension action simultaneously, and the photovoltaic panel will start to extend.

General closing retraction operation: pressing and holding the general closing button, and all systems will perform retraction actions until they are fully retracted and automatically locked.

ACC Linkage Control Process

Connecting the ACC signal: connecting the ACC linkage control module of the device correctly to the ACC signal source of a car.

State detection: when the motion mechanism (photoelectric board) is not in a retracted state, the ACC signal is triggered when a car key is turned on.

Automatic retraction: after receiving the ACC signal, the device automatically performs the retraction action to retract and lock the photovoltaic panel.

Operation restriction: when ACC is turned on, all remote-control operations are invalid. The priority of the ACC signal is higher than that of the remote control, ensuring that the device is in a safe state when the car is started.

Anti-Collision Function Workflow

Normal operation: during the expansion and contraction process of the device, the driving component operates at a set thrust (>20 KG) to push the telescopic component.

Obstacle detection: when the photovoltaic panel encounters obstacles during expansion and contraction, the motor speed will instantly increase. When the thrust exceeds the resistance thrust (>25 KG), the sensors inside the device detect the change in resistance.

Stop when encountering obstacles: the sensor transmits a signal to the control system, and the control system issues an instruction. The motor immediately stops running, and the telescopic component automatically stops to avoid hard collisions between the device and obstacles, ensuring the safety of the protective device.

Wind Resistant Workflow

Wind monitoring: the device is provided with a wind sensor to monitor the real-time wind speed in the environment.

Wind force judgment: when the wind sensor detects a crosswind speed less than 17 m/s (wind resistance in extended state), the device works normally, and the photovoltaic panel remains in its current state.

Emergency response: if the wind speed exceeds level 8 or the crosswind speed is greater than 17 m/s, the wind sensor will transmit the signal to the control system. The control system may issue an instruction to automatically retract or fully retract the photovoltaic panel according to a preset program to enhance the stability of the device, reduce the impact of wind on the device, and ensure the safe operation of the device in strong wind environments.

The above embodiments are only used to illustrate the present disclosure and are not intended to limit the present disclosure. Those skilled in the art can make various changes and modifications without departing from the spirit and scope of the present disclosure. Therefore, all equivalent technical solutions also belong to the scope of the present disclosure, and the protection scope of the present disclosure should be limited by the claims.

What is claimed is:

1. A high-efficiency and scalable electric photovoltaic device, comprising: a housing component, a driving component, telescopic components, and a controller:

the driving component is provided at a head portion of the housing component, and the telescopic components are provided on two sides of the housing component;

the controller is provided on the driving component, and the driving component is configured to drive the telescopic components to perform reciprocating motion;

wherein the housing component comprises a first sealing plate, a second sealing plate, a protective cover, an installation housing, side installation plates, a C-shaped plate, and a L-shaped plate, an interior of the protective cover is provided with the installation housing, and the driving component is provided inside the installation housing;

left and right sides of the protective cover are both provided with the side installation plates, and tops of the side installation plates are configured to install photovoltaic modules;

front and rear sides of the side installation plates are respectively provided with the first sealing plate and the second sealing plate;

the C-shaped plate is provided inside the side installation plates, and the telescopic components are provided on inner sides of the side installation plates through the C-shaped plate;

the L-shaped plate is provided on inner sides of the telescopic components, and the L-shaped plate is configured to install the photovoltaic modules.

2. The high-efficiency and scalable electric photovoltaic device according to claim 1, wherein a plurality of fixing blocks are provided on the side installation plates and the L-shaped plate, and the fixing blocks are configured to fix and install the photovoltaic modules.

3. The high-efficiency and scalable electric photovoltaic device according to claim 1, wherein a plurality of installation plates are provided on outer sides of the side installation plates.

4. The high-efficiency and scalable electric photovoltaic device according to claim 3, wherein the driving component comprises a motor, a motor mounting member, a motor fixing member, a first coupling, a second coupling, a limit rod, a gear member, a connection rod, a first gear installation rod, a second gear installation rod, a first gear, a second gear, a driven gear member, a third gear installation rod, a fourth gear installation rod, and a gear fixing plate, the motor fixing member is provided on a left side of the motor mounting member, a motor shaft of the motor is connected to a shaft of the gear member through the first coupling, the motor is provided between the motor fixing member and the motor mounting member, the gear component is provided in the motor mounting member, the limit rod is provided on a rear side of the gear component, a front side of the gear component is provided with the driven gear component that meshes with gears in the gear component:

a left side of the driven gear component is connected to the first gear installation rod, the first gear is provided on the first gear installation rod:

a left side of the gear component is provided with the second gear installation rod, the second gear is provided on the second gear installation rod;

the first gear meshes with the second gear, a rear side of the motor is provided with the connection rod that penetrates the motor fixing component:

the gear fixing plate is provided with the third gear installation rod and the fourth gear installation rod:

the third gear installation rod and the fourth gear installation rod are respectively connected to the third gear and the fourth gear, the third gear rod penetrates the gear fixing plate and is connected to the connection rod through the second coupling.

5. The high-efficiency and scalable electric photovoltaic device according to claim 4, wherein the driven gear member is further provided with a toggle member, and the toggle member is configured to control the driven gear member to move forward or backward so as to mesh with or not mesh with the gear member.

6. The high-efficiency and scalable electric photovoltaic device according to claim 5, wherein the telescopic components comprise a gear rack, first POM rods, a second POM rod, a first M-shaped profile, a second M-shaped profile, and a limit block, the gear rack is provided inside the side installation plates, the first M-shaped profile is provided inside the C-shaped plate, the first POM rods are provided at a top and a bottom of the first M-shaped profile, the first M-shaped profile is slid on the C-shaped plate through the first POM rods, the limit block is provided on a rear side of the first M-shaped profile, and the second M-shaped profile is provided inside the first M-shaped profile:

a top and a bottom of the second M-shaped profile are provided with a second PB board, the second M-shaped profile is slid on the first M-shaped profile through the second POM rod, the limit block is configured to prevent the second POM rod from sliding out.

7. The high-efficiency and scalable electric photovoltaic device according to claim 6, wherein the controller is a circuit board.

8. The high-efficiency and scalable electric photovoltaic device according to claim 7, wherein the circuit board is provided with a main control circuit, a power interface circuit, an LDO voltage stabilizing circuit, a remote-control receiving circuit, a code signal detection circuit, a motor output driving circuit, a wind sensing circuit, a buzzer circuit, a Hall signal acquisition circuit, and a motor output circuit, wherein the motor output driving circuit is electrically connected to the motor output circuit, the main control circuit is electrically connected to the power interface circuit, the LDO voltage stabilizing circuit, the remote-control receiving circuit, the code signal detection circuit, the motor output driving circuit, the wind sensing circuit, the buzzer circuit, and the Hall signal acquisition circuit.

* * * * *